Dec. 22, 1959      T. E. ERICSSON      2,918,133
POWERED BARROW OR CART
Filed April 8, 1957      2 Sheets-Sheet 1

INVENTOR.
Thurlow E. Ericsson
BY
ATTORNEY

Dec. 22, 1959      T. E. ERICSSON      2,918,133
POWERED BARROW OR CART

Filed April 8, 1957      2 Sheets-Sheet 2

INVENTOR.
Thurlow E. Ericsson
BY
ATTORNEY

United States Patent Office 2,918,133
Patented Dec. 22, 1959

2,918,133

POWERED BARROW OR CART

Thurlow E. Ericsson, Wheat Ridge, Colo.

Application April 8, 1957, Serial No. 651,300

5 Claims. (Cl. 180—19)

This invention relates to wheeled, manually-dirigible power vehicles of cart or barrow type adapted for the handling and transportation of diverse materials, and has as an object to provide a novel and improved such unit characterized by enhanced utility and facility of operation.

A further object of the invention is to provide a manually-dirigible, powered vehicle of cart or barrow type that is adaptable with practical advantage to a wide range of particular uses.

A further object of the invention is to provide a novel and improved powered cart or barrow adapted for self-propulsion in either direction of travel in reaction to the manipulation of simple controls.

A further object of the invention is to provide a novel and improved powered cart or barrow that is readily adaptable for use in particular specialized operations through simple variation of its hopper or tray element.

A further object of the invention is to provide a novel and improved construction and correlation of elements constituting a wheeled, manually-dirigible, powered vehicle of cart or barrow type.

A further object of the invention is to provide a novel and improved wheeled, manually-dirigible, powered chassis for a vehicle of cart or barrow type.

A further object of the invention is to provide a novel and improved construction and operative correlation of elements constituting a wheeled, manually-dirigible, powered chassis for vehicles of cart or barrow type.

A further object of the invention is to provide a novel and improved manually-dirigible, self-propelled cart or barrow unit that is simple and inexpensive of production, highly variable and adaptable as to specific use character, operatively manipulable with convenience and positive control, and that is durable and free from onerous maintenance requirements throughout long periods of use.

With the foregoing and other objects in view, my invention consists in the construction, arrangement, and operative combination of elements as hereinafter set forth, pointed out in my claims, and illustrated by the accompanying drawings, in which:

Figure 1:
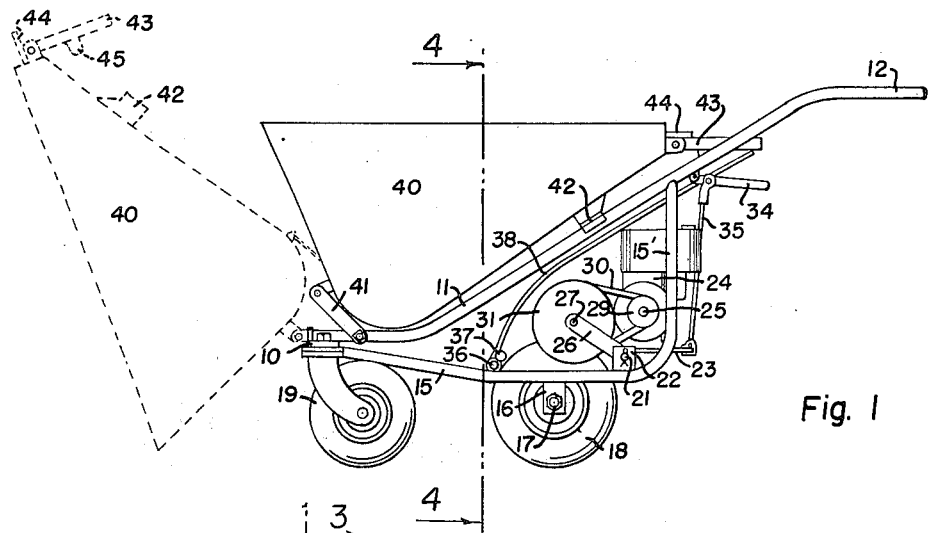
Figure 1 is a side elevation of a practical embodiment of the invention as arranged ready for use in a variety of particular operations, an alternative position of the hopper element being indicated by broken lines.

In any expedient particularity of size and construction, the elements of the improvement are operatively related with a rigid frame including a transverse forward member 10 fixedly engaged with the forward ends of preferably tubular, longitudinal members 11 extending at an upward inclination and in a lateral divergence from the member 10 to terminate in rearwardly-directed, free handle portions 12. A strut 13 fixedly engages transversely between the members 11 rearwardly adjacent the member 10 and a similar strut 14 fixedly interconnects the members 11 in a spacing rearwardly from the strut 13, whereby to rigidly interrelate the members 10 and 11 as a frame symmetrical with respect to a vertical plane centrally and longitudinally thereof. The frame comprised from the members 10 and 11 and the struts 13 and 14 fixedly supports and is supplemented by angular brackets 15, expediently of tubular material, correspondingly associated with each of the members 11 to approximately underlie the latter in rearward divergence therewith. One bracket 15 is associated with each of the members 11 and extends from fixed connection of its forward end to the member 10 to terminate in an angular offset 15′ directed toward and fixedly engaged with the associated member 11 forwardly adjacent the strut 14. The brackets 15 mount ears 16 fixedly projecting radially therefrom and away from the associated members 11 somewhat forwardly from the bracket offsets 15′, and an axle 17 is end-secured in and spans transversely of the frame assembly between said ears 16 for the rotatable support of spaced wheels 18 adapted to function as the principal and propulsive support of the unit. Supplementing the wheels 18, a pair of caster wheels 19 operatively engage with and depend from the opposite ends of the member 10 in a disposition effective to dispose the rearward stretch of the brackets 15 substantially horizontal, and the handle elements 12 of the members 11 substantially horizontal in elevated relation above the plane of said bracket stretches, when the wheels 18 and 19 are in engagement with a horizontal supporting surface, substantially as represented by Figure 1.

The wheels 18 in a freely-rotatable mounting on the shaft 17 are disposed in a lateral spacing inwardly adjacent the brackets 15, in which relation said wheels are intercoupled for simultaneous rotation by a hub 20 fixedly spanning therebetween in revoluble relation with the shaft 17. Parallel to and in a rearward and upward spacing from the shaft 17, a shaft 21 spans in clearing relation with the wheels 18 transversely of the frame assembly between ears 22 fixedly upstanding from the brackets 15 just forwardly of the offsets 15′ thereof, and a platform 23 fixed to and extending rearwardly from a central portion of said shaft 21 mounts a prime mover, such as an internal combustion engine unit assembly 24, in upstanding relation therewith between and beneath the upward and rearward inclination of the frame members 11, which prime mover is furnished with the customary controls, not shown, extended to position of convenient access adjacent the handle elements 12 and is mounted with its power output shaft 25 parallel to the shaft 21. Adjacent and inwardly of the ears 22, arms 26 are fixed to and extended radially from the shaft 21 in an upward and forward inclination effective to support a shaft 27 engaged between their free ends and transversely of the frame assembly in spaced parallelism with said shaft 21 and in clearing relation above upper arcs of the wheels 18. The shaft 27 rotatably mounts a small-diameter, cylindrical drum 28 in position and of a length to span over the treads of both wheels 18, and a pulley 29 on the power output shaft 25 of the engine assembly 24 is operatively aligned with and connected by a belt 30 to a complementary pulley 31, of relatively greater size, concentric with and fixed to one end of the drum 28. A concentric, annular enlargement 32 on the hub 20 between the wheels 18 is peripherally grooved in registration with grooves on the drum 28 for the accommodation of a multi-belt drive 33 operable at times to transmit rotation of the drum 28 to and for reduced-speed rotation of the enlargement 32 and the hub 20 and wheels 18 fixedly associated therewith. Thus the power of the prime mover 24 is applied through the drives shown and described to rotate the wheels 18 at much reduced speed in a direction of vehicle forward advance, and such drive is automatically operable and effective with the prime mover operating whenever the belts included in the drive are operatively tensioned. As should be apparent, the belt 30 is at all times conditioned to apply operation of the prime mover for rotation of the pulley 31 and the drum 28 therewith associated, while the drive represented by the belts 33 is operable to transmit power to the traction wheel assembly when the drum 28 is in such maximum separation from the wheels 18 as serves to operatively tension said belts. Mounted for oscillation about the shaft 21, the platform 23, prime mover 24, arms 26, and drum 28, with their associated elements, constitute a unit adjustable to vary the relationship between the drum 28 and wheels 18, which unit is normally urged by the unbalanced weight of the prime mover 24 disposed rearwardly of the shaft 21 in a direction effective to tighten the belt drive 33 and thereby maintain the power transmission engaged for forward drive of the vehicle. Selective tilting of the unit represented by the platform 23 to interrupt forward drive of the vehicle and to establish, when desired, rearward drive of the vehicle is a manual operation under control of the vehicle operator by means of a lever 34 hinged to the strut 14 in position of convenient access and connected by means of a link 35 with a rear margin of the platform 23, so that elevation of the lever 34 acts to tilt the assembly represented by the platform 23 in a direction effective to approach the drum 28 toward the wheels 18 with consequent slacking of the belt drive 33 and corresponding interruption of the forward drive. The forward drive may be checked in the manner just described before the drum 28 is brought into engagement with the treads of the wheels 18, but elevation of the lever 34 beyond that necessary to interrupt the forward drive is operable to engage the drum 28 against the treads of the wheels 18 and thereby complete a power transmission operable through frictional engagement of said drum with the wheel treads to establish a reverse, or rearward, drive of the vehicle. As will be understood, the lever 34 may be associated with any appropriate arrangement of latch means, not shown, effective to retain the lever in any desired one of its several positions of adjustment, whereby to retain the power drive of the vehicle in either inoperative, or forward, or rearward driving relation with the wheels.

Control of vehicle operation is completed through the provision of braking means operable to retard vehicle travel and to hold the vehicle in any position of rest, such means being typified by a shaft 36 revolubly spanning between the brackets 15 parallel to the shaft 17 in clearing relation with and forwardly of the wheels 18, and shoes 37 fixed eccentrically to said shaft 36 in position to bear at times against the treads of said wheels. An arm 38 fixed to one end of the shaft 36 extends upwardly and rearwardly of the vehicle frame assembly through a keeper 39 at the inner side of one of the bracket offsets 15' and into a position of convenient access by the vehicle operator; said keeper being organized in any feasible manner to yieldably retain the arm 38 in a position of upward adjustment effective to hold the shoes 37 out of engagement with the wheel treads and, alternatively, to yieldably retain said arm in a position of downward adjustment wherein said shoes are frictionally engaged with the wheel treads under pressures restrictive of wheel rotation.

Figure 2:
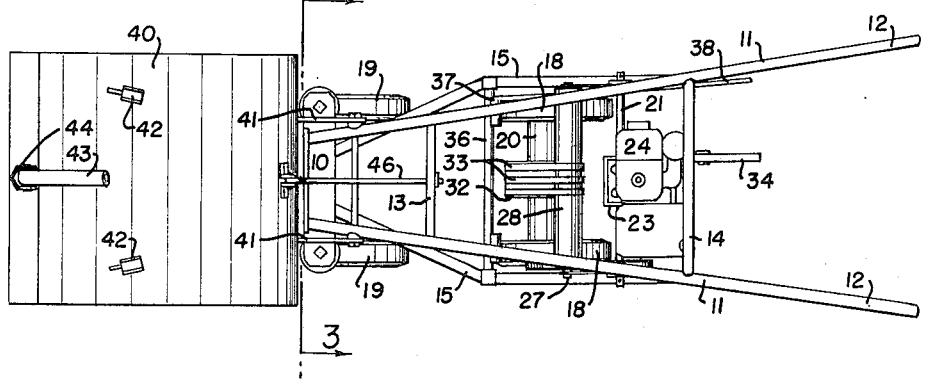
Figure 2 is a plan of the organization according to Figure 1 with the hopper element in the broken line position of the preceding view.
Figure 3:
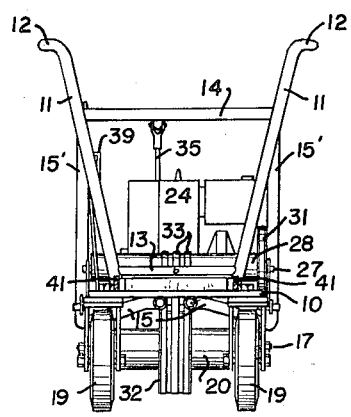
Figure 3 is a vertical section transversely of the organization according to the preceding views taken substantially on the indicated line 3—3 of Figure 2.
Figure 4:
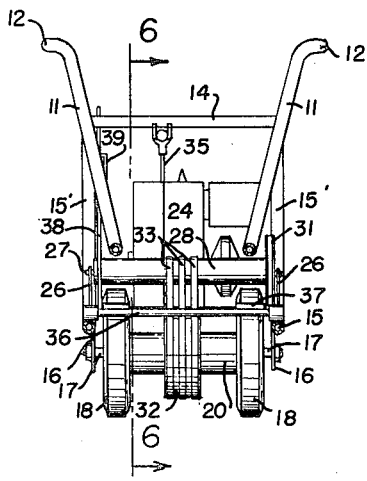
Figure 4 is a vertical section transversely of the organization according to the preceding views taken substantially on the indicated line 4—4 of Figure 1 with the hopper element omitted.
Figure 5:
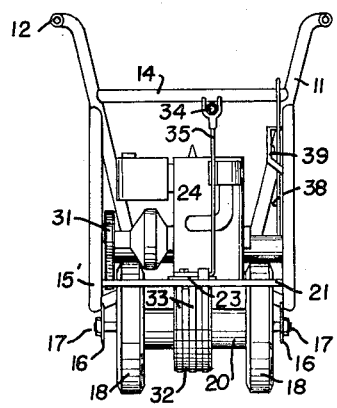
Figure 5 is a rear end elevation of the organization according to the preceding views with the hopper element omitted.
Figure 6:
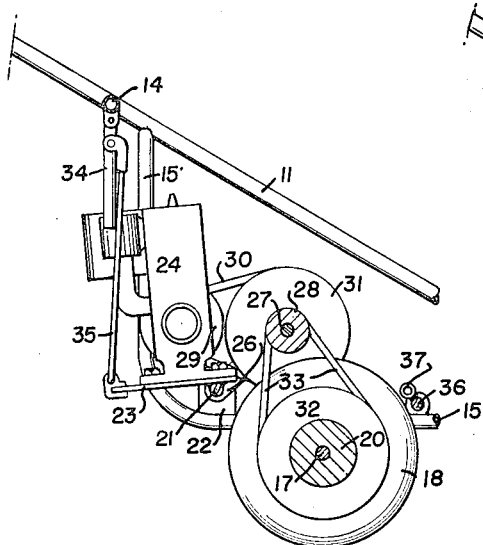
Figure 6 is a fragmentary, detail section, on a relatively enlarged scale, taken substantially on the indicated line 6—6 of Figure 4 with the propulsive elements of the organization engaged to effect forward drive of the unit.
Figure 7:
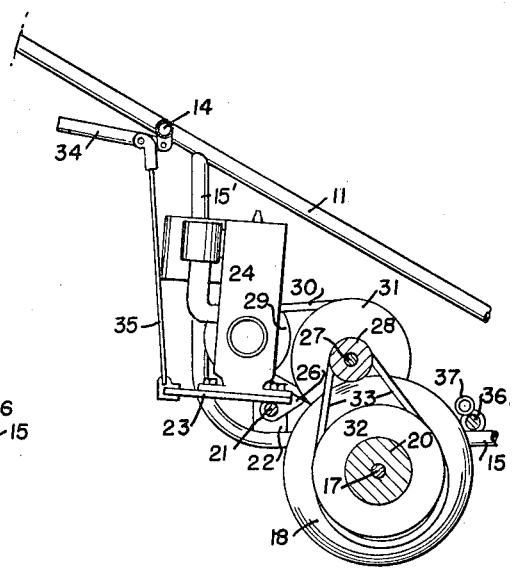
Figure 7 is a view similar to Figure 6 showing the propulsive elements of the organization as alternatively related to effect rearward drive of the unit.

The powered vehicle chassis constructed and operatively organized as shown and hereinabove described is a unit of wide utility susceptible of adaptation to particular uses through association therewith of trays, hoppers, racks, and similar load-accommodating facilities, of desired type and construction, one such hopper arrangement of wide practicality being illustrated in Figures 1 and 2. As shown, an open-top, unitary tray or hopper 40 is conformed to engage transversely of and above the members 11 in and to fill the angle resulting from the upward and rearward inclination thereof, and toggle links 41 operatively between forward end portions of said members 11, or the member 10, and the forward wall of said hopper hingedly connect the latter to the vehicle frame in a manner accommodating forward tilting, and consequent dumping, of said hopper in the manner represented by broken lines in Figure 1. Linked to the vehicle frame as shown, the major weight of the hopper and its contents is rearward of the hopper hinge axis when the hopper is retracted into its usual position on the frame, and bearing shoes 42 are secured to an under, rearward portion of the hopper in position to seat against the frame members 11 and thereby firmly position the hopper on and in position for translation with the vehicle. A lever 43 is hinged to a rearward, upper portion of the hopper 40 for elevation at times against an associated limiting stop 44, and a hook 45 carried by the lever 43 is adapted to latch at times on the strut 14 and thereby secure the hopper 40 against separation from the associated frame members 11. When it is desired to dump the hopper 40, the hook 45 is released from the strut 14 and the lever 43 is manually elevated to engagement with the stop 44 and to consequent forward rocking and dumping of the hopper 40. Inhibitive of overtravel of the dumped hopper 40 relative to the vehicle frame, a link 46 connects between the strut 13 and a forward underportion of said hopper in a length appropriate to limit forward travel of the hopper about the hinge axis provided by the toggle linkage 41.

Since changes, variations, and modifications in the form, construction, and arrangement of the elements shown and described may be had without departing from the spirit of my invention, I wish to be understood as being l:mited solely by the scope of the appended claims, rather than by any details of the illustrative showing and foregoing description.

I claim as my invention:

1. In a powered vehicle of the character described having a rigid, handled frame, wheels rollably supporting the forward end of said frame, a traction wheel unit rotatable about an axis transverse of said frame rollably supporting the latter in spaced relation with said first wheels, a shaft journaled on said frame in spaced, parallel relation with the axis of traction wheel unit rotation, a platform fixed to said shaft in projection radially therefrom rearwardly of the frame, a prime mover mounted on said platform with its power output axis parallel to said shaft, a drum revolubly supported from and in spaced, parallel relation with said shaft adjacent and to span across the treads of the traction wheel unit, a drive operatively connecting said drum with the power output axis of the prime mover, a belt drive connecting between said drum and the traction wheel unit, and means manually actuable to selectively adjust said shaft, platform, and drum angularly of the shaft axis between operative tensioning of said belt drive effective to rotate the traction wheel unit in one direction and frictional engagement of said drum with the traction wheel treads effective by virtue of consequent loosening of the belt drive to rotate said unit in the opposite direction.

2. The organization according to claim 1, wherein said traction wheel unit is constituted as a pair of like wheels fixed in spaced, parallel relation to the opposite ends of a coaxial, cylindrical hub, and a concentric, annular enlargement of said hub is peripherally grooved to coact with belt elements of said belt drive.

3. The organization according to claim 1, wherein said traction wheel unit includes a hub formed with an annular, peripherally-grooved enlargement, said drum parallels the axis of said unit at the side of its supporting shaft adjacent said unit and remote from the associated platform, said drum is peripherally grooved as a complement to said enlargement, and elements of the belt drive work in said grooves and extend between the drum and enlargement for operative tensioning when the drum is rocked upon its mounting away from the wheel unit.

4. The organization according to claim 1, wherein complementary arms fixedly and perpendicularly extend from the opposite ends of said shaft forwardly and upwardly of the frame away from the associated platform, and said drum is rotatably supported by and to extend between the free ends of said arms, whereby the unbalanced weight of the prime mover on the platform acts through the shaft to urge the drum away from the traction wheel unit.

5. The organization according to claim 1, wherein the means applicable to selectively adjust the shaft about its axis consists of a lever hinged to the frame adjacent the frame handles for actuation through a vertical arc, and a linkage hingedly connecting between said lever and the rearward, free margin of said platform, whereby elevation of the free end of said lever acts to elevate the rearward margin of the platform.

References Cited in the file of this patent

UNITED STATES PATENTS

| | | |
|---|---|---|
| 828,713 | Coffman et al. | Aug. 14, 1906 |
| 2,468,839 | Rodesci | May 3, 1949 |
| 2,535,254 | Attwell | Dec. 26, 1950 |
| 2,566,164 | Callison | Aug. 28, 1951 |
| 2,572,109 | Coates | Oct. 23, 1951 |

FOREIGN PATENTS

| | | |
|---|---|---|
| 475,161 | Great Britain | Nov. 11, 1937 |